(12) United States Patent
Kuroki (10) Patent No.: US 7,681,062 B2
(45) Date of Patent: Mar. 16, 2010

(54) SYNCHRONOUS TYPE SEMICONDUCTOR DEVICE FOR HIGH SPEED DATA PROCESSING

(75) Inventor: Koji Kuroki, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 665 days.

(21) Appl. No.: 11/586,510

(22) Filed: Oct. 26, 2006

(65) Prior Publication Data

US 2007/0101177 A1    May 3, 2007

(30) Foreign Application Priority Data

Oct. 27, 2005   (JP)   ............... 2005-313120

(51) Int. Cl.
   *G06F 1/12*   (2006.01)
(52) U.S. Cl. ................. 713/400; 713/501; 327/141
(58) Field of Classification Search ............. 713/400, 713/501; 327/141; 365/233.1
   See application file for complete search history.

(56) References Cited

U.S. PATENT DOCUMENTS 6,188,641 B1 *   2/2001   Uchida .................. 365/230.06
6,594,770 B1      7/2003   Sato et al.
2001/0007136 A1 * 7/2001   Tamura et al. ............... 713/500

FOREIGN PATENT DOCUMENTS

JP          3549751 B2      4/2004

* cited by examiner

*Primary Examiner*—Thuan N Du
(74) *Attorney, Agent, or Firm*—Sughrue Mion, PLLC (57) ABSTRACT

Disclosed is a synchronous semiconductor device including clock generation circuit that frequency divides a clock signal (PCLK) input from an input buffer and generates first and second internal clock signals having a predetermined phase difference from first and second frequency-divided clock signals of different phases, respectively, a first input circuit control unit that receives a chip select signal and samples the chip select signal in synchronization with the clock signal, second and third input circuit control units that sample an output of the first input circuit control unit in synchronization with the first and second internal clock signals, respectively, and first and second input circuits that receive a result of a logic operation between the output of the first input control unit and an output of the second input circuit control unit and a result of a logic operation between the output of the first input circuit control unit and an output of the third input circuit control unit as input enable signals, respectively, and sample an externally input signal in synchronization with the first and second internal clock signals, respectively based on enabling instructed by the input enable signals.

11 Claims, 5 Drawing Sheets

SYNCHRONOUS TYPE SEMICONDUCTOR DEVICE FOR HIGH SPEED DATA PROCESSING

FIELD OF THE INVENTION

The present invention relates to a semiconductor device. More specifically, the invention relates to a synchronous semiconductor device adapted to reduce power consumption of an input circuit therein.

BACKGROUND OF THE INVENTION

As one of techniques for reducing power consumption, using a potential level state of a chip select signal /CS (in which a symbol/before a signal name CS indicates active low), control is performed so that when a potential level of a signal CSB (which is an inverted signal of the signal CS) is HIGH,
- two-phase internal clocks to be supplied to a command, address, and data input system are stopped,
- a synchronous type input buffer is stopped, or
- a latch circuit portion of an asynchronous type buffer, which uses a flip-flop circuit or the like, is stopped (such that an output signal of a latch circuit does not transition).

In a synchronous DRAM in particular, only when the chip select signal /CS is LOW, a command or an address is supplied, as described before. When the chip select signal /CS is HIGH, a command or an address is not necessary. Further, when an effective command enters (in a cycle while the chip select signal /CS is LOW), entry of a next command is not performed (usually for several clocks) until when the command is completed. Accordingly, since entry of an effective command is performed at most once in several cycles, operating the circuit that receives unnecessary commands and address signals (of approximately 20 inputs) in each cycle leads to an increase in the power consumption that becomes more unwanted in a higher-speed operation of the synchronous DRAM. An approach to causing the circuit that receives a command or an address to operate only when the chip select signal /CS is LOW, so as to cut back such unnecessary power consumption, is known. As an example where an approach to operating the semiconductor device of this type using a frequency-divided clock signal, so as to support the higher-speed operation in particular, is shown, a description in Patent Document 1 or the like is referred to.

Figure 1:
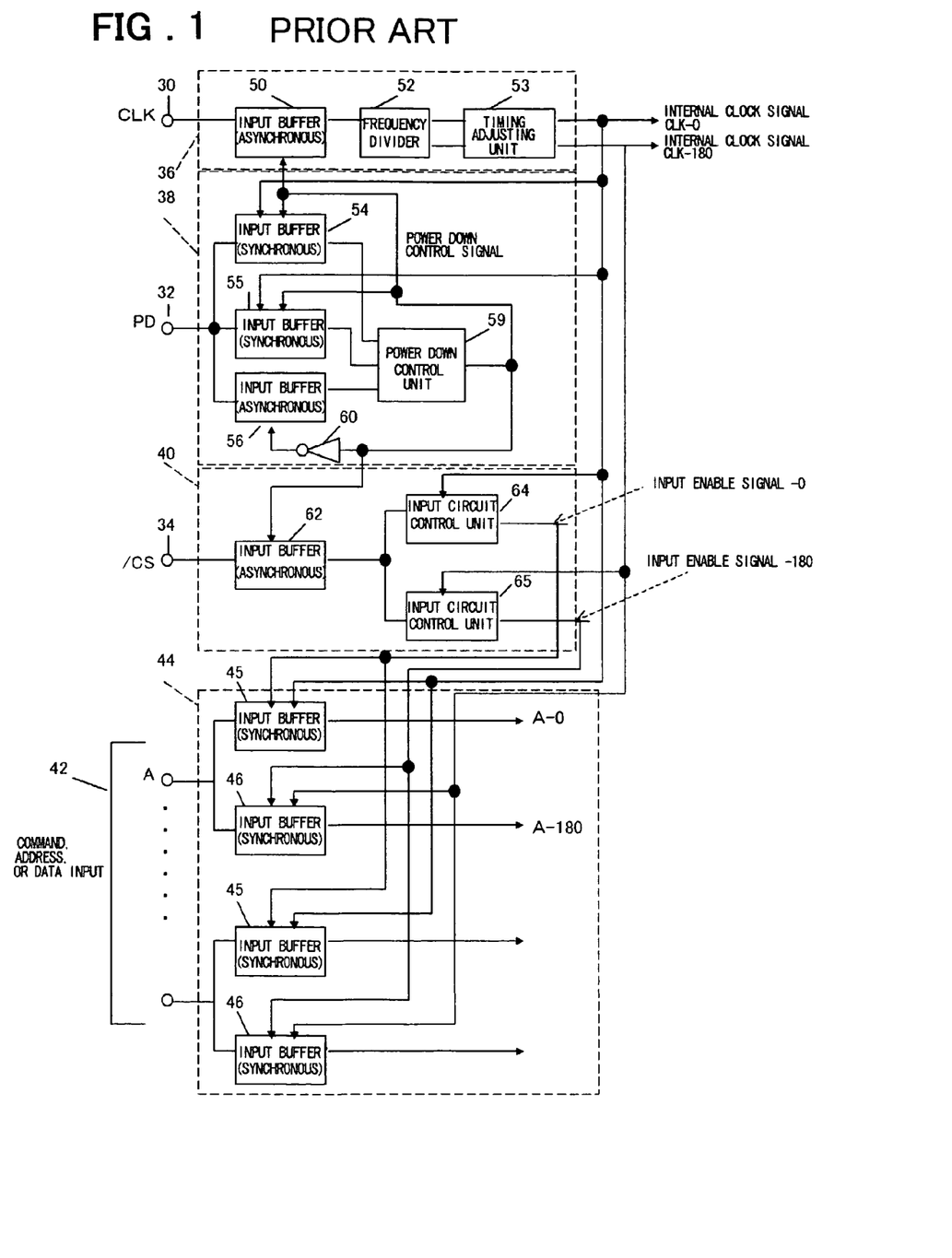
FIG. 1 is a diagram showing a configuration of a prior art synchronous type semiconductor memory device.
Figure 2:
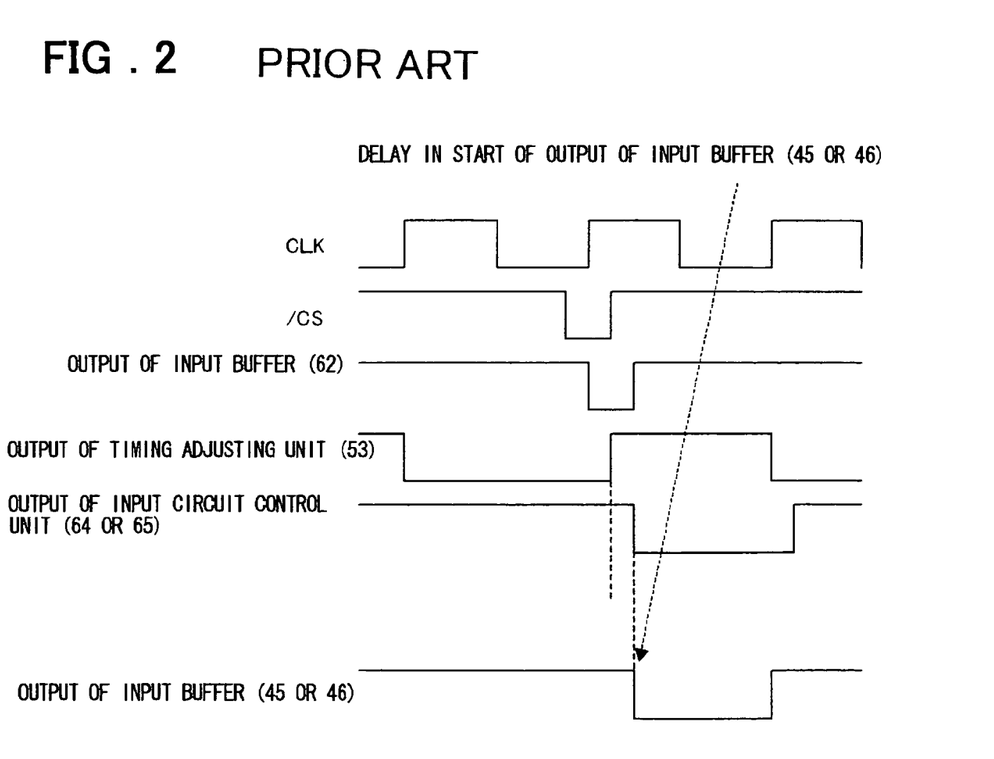
FIG. 2 is a timing diagram for explaining an operation in FIG. 1.

FIG. 1 is a diagram showing a configuration described in Patent Document 1, and shows an input portion of the synchronous DRAM (refer to FIG. 8 in Patent Document 1). FIG. 2 shows timing waveforms of signals for explaining an operation of a circuit in FIG. 1. An external clock signal (CLK) is frequency divided so as to secure an internal timing margin. Then, using two-phase internal clock signals (an internal clock signal CLK-0 and an internal clock signal CLK-180 of opposite phases, with the phases separated to each other by 180 degrees), the chip select signal is controlled. Referring to FIG. 1, the clock signal CLK, a power down signal PD, and the chip select signal /CS are supplied to a clock generation circuit 36, a power down circuit 38, and a chip select circuit 40, from external terminals 30, 32, and 34, respectively. Then, an N-bit signal such as a command, an address, or data is supplied to an input circuit 44 from an external terminal 42. The clock generation circuit 36 includes an asynchronous type input buffer 50, a frequency divider 52 that receives the clock signal output from the input buffer 50, and a timing adjusting unit 53 that receives the frequency-divided clock signals of mutually different phases output from the frequency divider 52. The input buffer 50 becomes inactive when a power down control signal supplied from the power down circuit 38 is LOW and becomes active when the power down control signal is HIGH. The timing adjusting unit 53 includes a DLL (Delay Locked Loop) circuit, for example. The two-phase internal clock signals CLK-0 and CLK-180, generated by the clock generation circuit 36 based on the external clock signal CLK when the input buffer 50 is operated are supplied to each of the circuits.

The power down circuit 38 includes synchronous type input buffers 54 and 55, an asynchronous input buffer 56, a power down control unit 59, and an inverter 60. When a power down signal PD supplied to the external terminal 32 is LOW and instructs power down, the asynchronous type input buffer 56 which consumes small power, and to which a HIGH level output of the power down control unit 59 inverted by the inverter 60 is supplied, is made active, and the synchronous type input buffers 54 and 55, which consume large power, are made inactive by the HIGH level output (power down control signal) of the power down control unit 59. When the power down signal PD then goes HIGH and instructs power on, an output of the power down control unit 59 goes LOW by an output of the input buffer 56. Then, the asynchronous type input buffer 56, which consumes small power, is made inactive, and the synchronous type input buffers 54 and 55, which consume large power, are made active. This output of the power down control unit 59 is supplied to each of the circuits as the power down control signal.

The chip select circuit 40 includes an asynchronous type input buffer 62 and input circuit control units 64 and 65. To the input buffer 62 with the chip select signal /CS supplied thereto, the power down control signal from the power down circuit 38 is supplied. At a time of power on, responsive to the chip select signal /CS from the input buffer 62, the input circuit control units 64 and 65 generate input enable signals that instruct enabling at a HIGH level by switching between falling and rising edges of the internal clock signal CLK-0 or CLK-180, and supplies so generated input enable signals to the input circuit 44.

The input circuit 44 is constituted from N pairs of input buffers 45 and 46. To these input buffers 45 and 46, the power down control signal from the power down circuit 38 and the input enable signals from the chip select circuit 40 are supplied. Since the power down control signal is LOW when a normal operation is performed, a state of the chip select signal /CS is checked by the input circuit control units 64 and 65 in each clock cycle. Only when the chip select signal /CS is LOW, either of the input enable signal −0 and the input enable signal −180 instructs enabling (is made active). Then, a signal supplied from the external terminal 42 is sampled by the input buffers 45 and 46 in synchronization with the internal clock signals CLK-0 or CLK-180, respectively. Each of output signals A-0 and A-180 is supplied to a subsequent internal circuit (not shown).

[Patent Document 1]
JP Patent No. 3549751 (FIG. 8)

SUMMARY OF THE DISCLOSURE

The configuration shown in FIG. 1, however, may cause a reduction in an operating margin when operated at a high frequency. This is caused because the input circuit control units 64 and 65 are each constituted from at least two or more logic stages, and when the number of logic stages from an output of the timing adjusting unit 53 to the input buffer 45 or

46 is compared with the number of logic stages from an output of the input circuit control unit 64 to the input buffer 45 or an output of the input circuit control unit 65 to the input buffer 46, the number of the logic stages in the latter (the number of the logic stages from the output of the input circuit control unit 64 or 65 to the input buffer 45 or 46) is larger.

Assume that the input portion having the configuration shown in FIG. 1 is applied to a product with a high operating frequency (with a clock cycle time tCK being equal to or smaller than 1.5 ns, for example), and assume that a set-up time (tIS) specification of 200 ps or less is set to the product. Then, since the set-up time tIS becomes small, latch timings for activating the input buffers 45 and 46, respectively, are determined by paths from the outputs of the input circuit control units 64 and 65 to the input buffers 45 and 46, respectively.

That is, while the input buffers 45 and 46 sample the signal (an address signal A in FIG. 1) responsive to the internal clock signals CLK-0 and CLK-180, respectively, the input enable signals −0 and −180 (also referred to as "clock enable signals"), which are the signals that control enabling of the internal clock signals CLK-0 and CLK-180, are determined by the internal clock signals CLK-0 and CLK-180, respectively. Accordingly, times (timings) at which the input buffers 45 and 46 output the signals will be determined by the input enable signals −0 and −180 that are output later than the internal clock signals CLK-0 and CLK-180. As a result, outputs of the input buffers 45 and 46 are delayed, and pulse widths of the outputs of the input buffers 45 and 46 become shorter than in a normal case, leading to the reduction in the operating margin.

As described above, in the semiconductor device (synchronous DRAM) described with reference to FIGS. 1 and 2, it has become difficult to secure a margin for preventing erroneous sampling of information in an immediately preceding cycle or a margin for reducing the pulse width of each of the internal clock signal in a high-frequency operation with a clock period tCK being equal to or smaller than 1.5 ns or the like.

Accordingly, an object of the present invention is to provide a synchronous type semiconductor device that secures a margin for preventing erroneous sampling of information in an immediately preceding cycle or a margin for reducing the pulse width of each internal clock signal even in a high-frequency operation.

The above and other objects are attained by the present invention configured as follows.

A synchronous type semiconductor device according to one aspect of the present invention comprises:

a clock generation circuit that generates from an input clock signal first and second internal clock signals with a predetermined phase difference;

a first circuit that samples an input chip select signal in synchronization with the input clock signal;

second and third circuits that receive an output signal of the first circuit in common and sample the output signal in synchronization with the first and second internal clock signals, respectively; and first and second input buffers that receive a result of a logic operation between the output signal of the first circuit and an output signal of the second circuit and a result of a logic operation between the output signal of the first circuit and an output signal of the third circuit as first and second input enable signals, respectively, and sample a common input signal in synchronization with the first and second internal clock signals, respectively, based on enabling instructed by the first and second input enable signals.

A synchronous type semiconductor device according to other aspect (aspect) of the present invention includes:

a clock generation circuit that generates first and second internal clock signals having a predetermined phase difference from first and second frequency-divided clock signals having different phases, respectively, the first and second frequency-divided clock signals being obtained by frequency dividing an input clock signal by a frequency divider;

a first circuit that samples an input chip select signal in synchronization with the input clock signal when the second frequency-divided clock signal is active;

a second circuit that samples the input chip select signal in synchronization with the input clock signal when the first frequency-divided clock signal is active;

a third circuit that samples an output signal of the first circuit in synchronization with the first internal clock signal;

a fourth circuit that samples an output signal of the second circuit in synchronization with the second internal clock signal; and first and second input buffers that receive a result of a logic operation between the output signal of the first circuit and an output signal of the third circuit and a result of a logic operation between the output signal of the second circuit and an output signal of the fourth circuit as first and second input enable signals, respectively, and sample a common input signal in synchronization with the first and second internal clock signals, respectively, based on enabling instructed by the first and second input enable signals.

A synchronous type semiconductor device according to the present invention includes:

a first input buffer that receives a clock signal;

a frequency divider that receives a clock signal output from the first input buffer, frequency divides the clock signal, and outputs frequency-divided clock signals;

a timing adjusting unit that receives the frequency-divided clock signals output from the frequency divider and generates first and second internal clock signals having a predetermined phase difference;

a second input buffer that receives a chip select signal;

a first input circuit control unit that receives an output signal of the second input buffer and an output signal of the first input buffer, and samples the output signal of the second input buffer in synchronization with the output signal of the first input buffer;

a second input circuit control unit that receives an output signal of the first input circuit control unit and the first internal clock signal from the timing adjusting unit, and samples the output signal of the first input circuit control unit in synchronization of the first internal clock signal;

a third input circuit control unit that receives the output signal of the first input circuit control unit and the second internal clock signal from the timing adjusting unit, and samples the output signal of the first input circuit control unit in synchronization with the second internal clock signal;

a first logic circuit that receives the output signal of the first input circuit control unit and an output signal of the second input circuit control unit, and outputs a result of a logic operation between the two output signals; and a second logic circuit that receives the output signal of the first input circuit control unit and an output signal of the third input circuit control unit, and outputs a result of a logic operation between the two output signals.

The present invention may be configured to include:

a third input buffer that receives an output signal of the first logic circuit as a first input control signal and latches an address signal supplied to an input terminal in synchronization with the first internal clock signal, when the first input control signal is active; and a fourth input buffer that receives an output of the second logic circuit as a second input control signal and latches the address signal in synchronization with the second internal clock signal, when the second input control signal is active.

In the present invention, it may be so arranged that the first input circuit control unit includes a latch circuit that latches and outputs the output signal of the second input buffer based on the output signal of the first input buffer;

the second input circuit control unit includes a latch circuit that latches and outputs the output signal of the first input circuit control unit based on the first internal clock signal; and the third input circuit control unit includes a latch circuit that latches and outputs the output signal of the first input circuit control unit based on the second internal clock signal.

A synchronous type semiconductor device according to the present invention includes:

a first input buffer that receives a clock signal;

a frequency divider that receives a clock signal output from the first input buffer, frequency divides the clock signal, and outputs first and second frequency-divided clock signals with phases thereof being different to each other;

a timing adjusting unit that receives the first and second frequency-divided clock signals from the frequency divider and generates first and second internal clock signals having a predetermined phase difference corresponding to the first and second frequency-divided clock signals, respectively;

a second input buffer that receives a chip select signal;

a first input circuit control unit that receives an output signal of the second input buffer and the output signal of the first input buffer, receives the second frequency-divided clock signal as an input control signal, and samples the output signal of the second input buffer in synchronization with the output signal of the first input buffer when the second frequency-divided clock signal is active;

a second input circuit control unit that receives the output signal of the second input buffer and the output signal of the first input buffer, receives the first frequency-divided clock signal as an input control signal, and samples the output signal of the second input buffer in synchronization with the output signal of the first input buffer when the first frequency-divided clock signal is active;

a third input circuit control unit that receives an output signal of the first input circuit control unit and the first internal clock signal from the timing adjusting unit, and samples the output signal of the first input circuit control unit in synchronization with the first internal clock signal;

a fourth input circuit control unit that receives an output signal of the second input circuit control unit and the second internal clock signal from the timing adjusting unit, and samples the output signal of the second input circuit control unit in synchronization with the second internal clock signal;

a first logic circuit that receives the output signal of the first input circuit control unit and an output signal of the third input circuit control unit, and outputs a result of a logic operation between the two output signals; and a second logic circuit that receives the output signal of the second input circuit control unit and an output signal of the fourth input circuit control unit, and outputs a result of a logic operation between the two output signals.

The present invention may be configured to include:

a third input buffer that receives an output signal of the first logic circuit as a first input control signal and latches an address signal supplied to an input terminal in synchronization with the first internal clock signal, when the first input control signal is active; and a fourth input buffer that receives an output of the second logic circuit as a second input control signal and latches the address signal in synchronization with the second internal clock signal, when the second input control signal is active.

In the present invention, it may be so arranged that the first input circuit control unit includes a latch circuit that latches and outputs the output signal of the second input buffer based on the output signal of the first input buffer when the second frequency-divided clock signal is active; and the second input circuit control unit includes a latch circuit that latches and outputs the output signal of the second input buffer based on the output signal of the first input buffer when the first frequency-divided clock signal is active.

In the present invention, it may be so arranged that the third input circuit control unit latches and outputs the output signal of the first input circuit control unit based on the first internal clock signal;

and the third input circuit control unit latches and outputs the output signal of the second input circuit control unit based on the second internal clock signal.

In the present invention, each of the first and second logic circuits is constituted from an OR circuit.

The meritorious effects of the present invention are summarized as follows.

According to the present invention, even in a high-frequency operation, a margin for preventing erroneous sample of information in an immediately preceding cycle or a margin for reducing a pulse width of each internal clock signal can be secured. A stable operation can be thus implemented.

Still other features and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

The present invention is characterized in that when an input is latched using a frequency-divided internal clock, an enable signal for the latching is made enable earlier than the frequency-divided clock, thereby increasing an enable width of the enable signal sufficiently. By latching a chip select signal /CS using a clock signal before frequency division and the frequency-divided clock signal, respectively, and forming a logical sum of both of the latched signals in enabled states, a leading edge of the enable signal is secured using the clock before the frequency division, and a trailing edge of the enable signal is secured using the frequency-divided clock. A description of the present invention will be given with reference to appended drawings. A synchronous type semiconductor device of the present invention includes an input buffer (100) that receives a clock signal CK supplied to an external terminal from outside, a frequency divider (102) that receives a clock signal (PCLK) output from the input buffer (100), frequency divides the clock signal (PCLK), and outputs frequency-divided clock signals, a timing adjusting unit (103) that receives the frequency-divided clock signals from the frequency divider (102) and generates two-phase internal clock signals (of internal clock signals CLK-0 and CLK-180 with phases thereof separated to each other by 180 degrees), an input buffer (101) that receives a chip select signal /CS, an input circuit control unit (104) that samples the chip select signal output from the input buffer (101) in synchronization with the input clock signal (PCLK) from the input buffer (100), an input circuit control unit (105) that samples a signal output from the input circuit control unit (104) in synchronization with an internal clock signal (CLK0), an input circuit control unit (106) that samples the signal output from the input circuit control unit (104) in synchronization with the internal clock signal (CLK-180), an OR circuit (107) that receives the output signal of the input circuit control unit (104) and an output signal of the input circuit control unit (105) and performs the operation of a logical sum (OR) of these signals, and an OR circuit (108) that receives the output signal of the input circuit control unit (104) and an output signal of the input circuit control unit (106) and performs the operation of a logical sum of these signals. The synchronous type semiconductor device of the present invention includes synchronous type input buffers (111, 112) that receive signals (CLKEN1, CLKEN2) output from the OR circuits (107, 108), respectively, as first and second input enable signals, respectively, receive the internal clock signals (CLK-0, CLK-180) as inputs, respectively, and receives a signal (an address A) supplied to an input terminal, for output to an internal circuit. In the present invention, the synchronous type input buffers (111, 112) for an address and the like are activated and deactivated according to a state of supplied to a chip select signal terminal /CS and based on the input enable signals (CLKEN1, CLKEN2).

In other embodiment of the present invention, a clock generation circuit includes the input buffer (100), frequency divider (102), and timing adjusting circuit (103). From frequency-divided clock signals (DIVCLK1, DIVCLK2) having different phases obtained by frequency dividing the input clock signal (PCLK) input from the input buffer (100) by the frequency divider (102), the first and second internal clock signals (CLK-0, CLK-180) having a predetermined phase difference are generated. The synchronous type semiconductor device in the other embodiment of the present invention includes an input circuit control unit (109), an input circuit control unit (110), the input circuit control unit (105), the input circuit control unit (106), the OR circuit (107), the OR circuit (108), and the first and second input buffers (111, 112). The input circuit control unit (109) receives the chip select signal /CS from the input buffer (101) and samples the chip select signal /CS in synchronization with the input clock signal (PLCK) when the frequency-divided clock signal (DIVCLK2) is active. The input circuit control unit (110) receives the chip select signal /CS from the input buffer (101) and samples the chip select signal /CS in synchronization with the input clock signal (PLCK) when the frequency-divided clock signal (DIVCLKD1) is active. The input circuit control unit (105) samples an output signal of the input circuit control unit (109) in synchronization with the first internal clock signal (CLK-0). The input circuit control unit (106) samples an output signal of the input circuit control unit (110) in synchronization with the second internal clock signal (CLK-180). The OR circuit (107) outputs a logical sum of the output signal of the input circuit control unit (109) and an output signal of the input circuit control unit (105). The OR circuit (108) outputs a logical sum of the output signal of the input circuit control unit (110) and an output signal of the input circuit control unit (106). The first and second input buffers (111, 112) receive output signals of the OR circuits (107, 108) as the input enable signals (CLKEN1, CLKEN 2), respectively, and sample an input signal (A) from outside, for output to the internal circuit, based on enabling instructed by the input enable signals and in synchronization with the first internal clock signal (CLK-0) and the second internal clock signal (CLK-180). A description will be given below in connection with embodiments.

Figure 3:
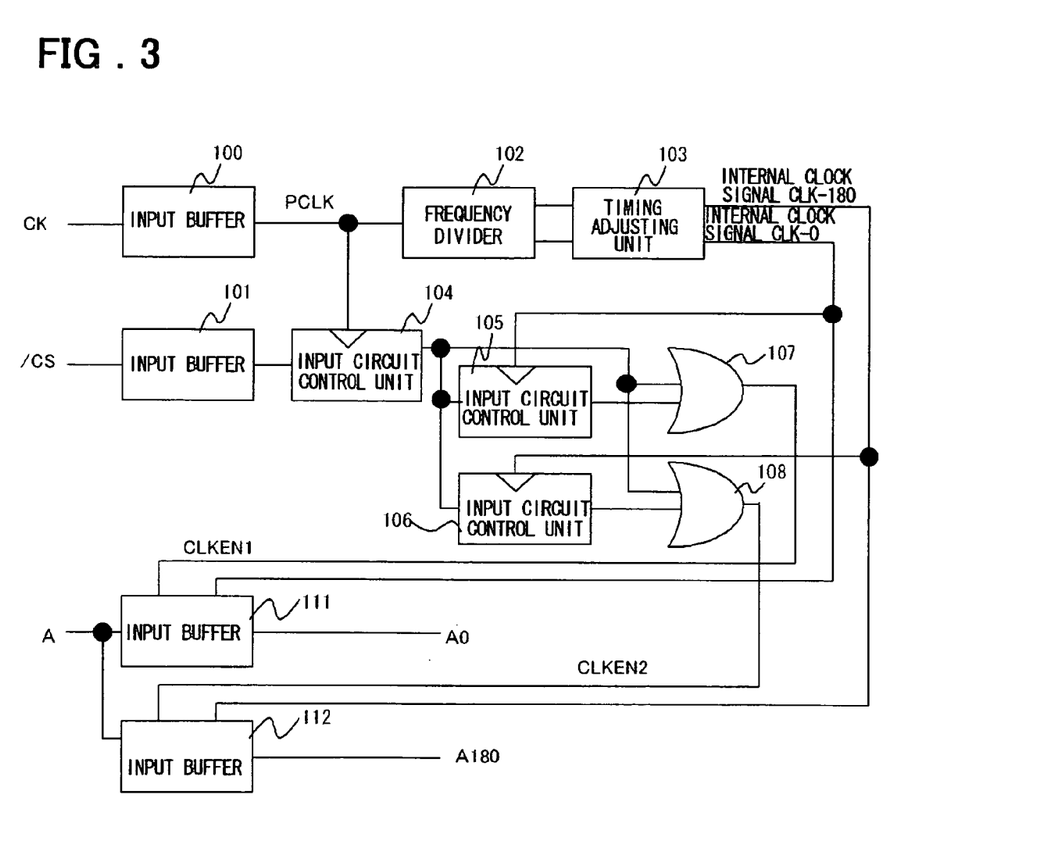
FIG. 3 is a diagram showing a configuration of an embodiment of the present invention.

FIG. 3 is a diagram showing a configuration of a synchronous type semiconductor device according to a first embodiment of the present invention, and corresponds to a configuration (an input portion of a synchronous DRAM) in FIG. 1. The input buffer 100, frequency divider 102, and timing adjusting unit 103 constitute a clock generation circuit. The timing adjusting unit 103 includes delay circuit or the like. The input buffer 100 receives the external clock signal CK. The frequency divider 102 frequency divides an output of the input buffer 100. The timing adjusting unit 103 receives an output of the frequency divider 102 and generates the two-phase internal clock signals CLK-0 and CLK-180.

The input buffer 101 receives the chip select signal /CS. The input buffer 101, input circuit control units 104, 105 and 106, and OR circuits 107 and 108 constitute a chip select circuit.

The input circuit control unit 104 latches and outputs the chip select signal output from the input buffer 101 responsive to the signal PCLK output from the input buffer 100.

The input circuit control unit 105 latches and outputs a signal output from the input circuit control unit 104 in synchronization with the internal clock signal CLK-0.

The input circuit control unit 106 latches and outputs a signal output from the input circuit control unit 104 in synchronization with the internal clock signal CLK-180.

The OR circuit 107 receives the output signal of the input circuit control unit 104 and an output signal of the input circuit control unit 105, and outputs a result of an OR logic operation of these signals as the first input enable signal (also referred to as a "clock enable signal") CLKEN1.

The OR circuit 108 receives the output signal of the input circuit control unit 104 and an output signal of the input circuit control unit 106, and outputs a result of an OR logic operation of these signals as the second input enable signal (also referred to as a "clock enable signal") CLKEN2.

The synchronous type input buffer 111 receives the first input enable signal CLKEN1 and the internal clock signal CLK-0. When the first input enable signal CLKEN1 instructs enabling (or is active), the synchronous type input buffer 111 latches an address bit supplied to an address terminal A in synchronization with the internal clock signal CLK-0, and outputs the latched signal as a signal A0.

The synchronous type input buffer 112 receives the second input enable signal CLKEN2 and the signal CLK-180. When the second input enable signal CLKEN2 instructs enabling (or is active), the synchronous type input buffer 112 latches the address bit supplied to the address terminal A in synchronization with the internal clock signal CLK-180, and outputs the latched signal as a signal A180.

Figure 4:
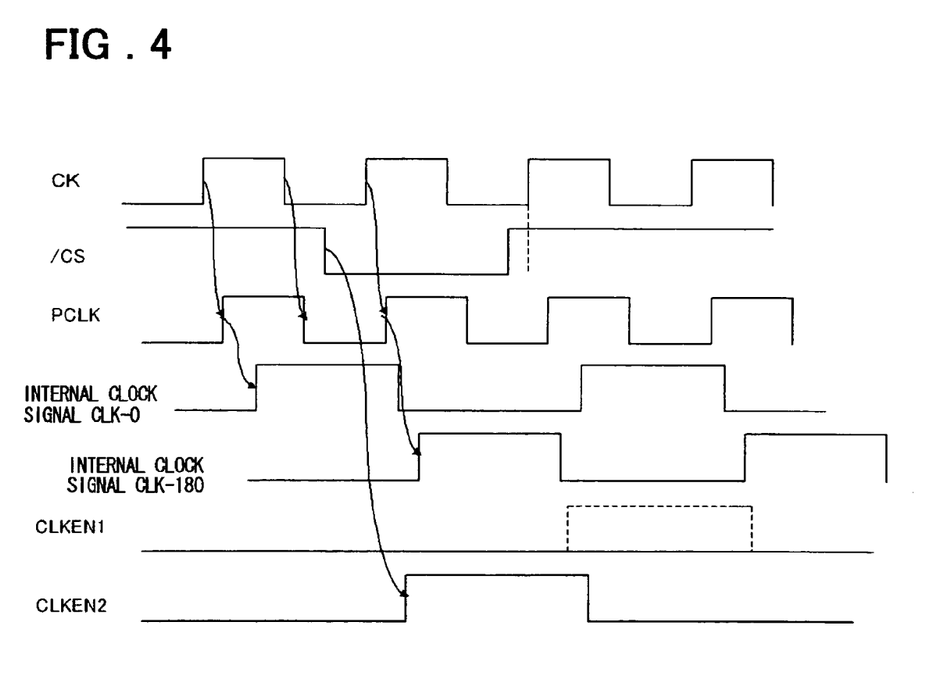
FIG. 4 is a timing diagram for explaining an operation of the embodiment of the present invention.

FIG. 4 is a timing chart for explaining an operation of the embodiment of the present invention. First, when a level of the chip select signal /CS transitions from a HIGH level to a LOW level, the signal CLKEN2, which is the output of the OR circuit 108 that has passed through the input circuit control unit 104, causes a state of the input buffer 112 to transition to a state where a signal from outside can be captured into an internal circuit (not shown) inside the semiconductor device, or to an activated state.

The input circuit control unit 104 performs sampling in response to the output PCLK of the input buffer 100 (which is the clock having the same period as the period of the external clock signal CK), and maintains the LOW level of the chip select signal /CS while a potential level of the output PCLK is HIGH. The input circuit control unit 106 latches the output signal of the input circuit control unit 104 in response to the internal clock signal CLK-180 and holds the output signal of the input circuit control unit 104 while the internal clock signal CLK-180 is HIGH. Accordingly, the signal CLKEN2, which is the output signal of the OR circuit 108, maintains the input buffer 112 to be in an active state (state in which external information can be captured into the internal circuit).

Then, when the internal clock signal CLK-180 transitions from HIGH to LOW, the output signal CLKEN2 of the OR circuit 108 performs control so that the input buffer 112 is transitioned to a deactivated state. Since the signal CLEKN1 is LOW, the input buffer 111, which receives the output CLKEN1 from the OR circuit 107, remains inactive.

In this embodiment, the number of logic stages required for generating the input enable signal CLKEN1 or CLKEN2 that controls activation and deactivation of the input buffer 111 or the input buffer 112, respectively, can be made to be the same or smaller than the number of logic stages required for generating each of the two-phase internal clock signals CLK-0 and CLK-180. For this reason, even in a high-frequency operation, a margin for preventing erroneous sampling of information in an immediately preceding cycle or a margin for reducing a pulse width of each of the internal clocks can be secured.

On contrast therewith, when the margins are secured by increasing the number of logic stages for generating each of the two-phase internal clock signals CLK-0 and CLK-180 in the configuration in FIG. 1, the internal clocks are delayed. A margin for performing the high-frequency operation will be therefore reduced.

Figure 5:
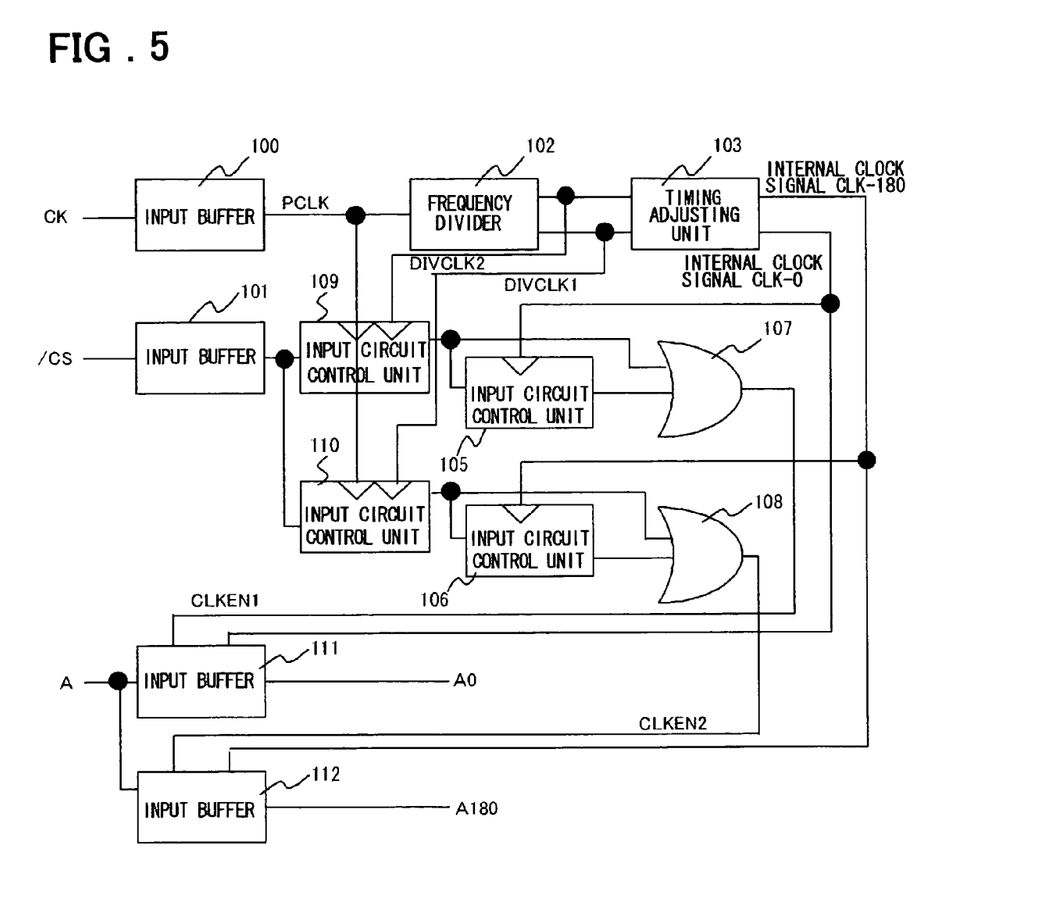
FIG. 5 is a diagram showing a configuration of other embodiment of the present invention.

Next, another embodiment of the present invention will be described. FIG. 5 is a diagram showing an overall configuration of a synchronous type semiconductor device according to a second embodiment of the present invention.

This embodiment includes the input buffer 100, frequency divider 102, timing adjusting unit 103, input buffer 101, input circuit control unit 109, input circuit control unit 110, input circuit control unit 105, input circuit control unit 106, OR circuit 107, and OR circuit 108. The input buffer 100 receives the external clock signal CK. The frequency divider 102 frequency divides the clock signal (PCLK) output from the input buffer 100, thereby outputting the first frequency-divided clock signal DIVCLK1 and the second frequency-divided clock signal DIVCLK2 having different phases. The timing adjusting unit 103 receives the first frequency-divided clock signal DIVCLK1 and the second frequency-divided clock signal DIVCLK2 from the frequency divider 102 and generates the two-phase internal clock signals CLK-0 and CLK-180 (internal clocks with the phases thereof mutually different to each other by 180 degrees). The input buffer 101 receives the chip select signal /CS. The input circuit control unit 109 receives the output signal PCLK from the input buffer 100, receives the frequency-divided clock signal DIVCLK2 from the frequency divider 102 as a control signal (control signal that enables input of the signal PCLK), and latches a signal from the input buffer 101 based on the clock signal PCLK output from the input buffer 100. The input circuit control unit 110 receives the output signal PCLK from the input buffer 100, receives the frequency-divided clock signal DIVCLK1 from the frequency divider 102 as a control signal (control signal that enables input of the signal PCLK), and latches the signal from the input buffer 101 based on the clock signal PCLK output from the input buffer 100. The input circuit control unit 105 latches a signal output from the input circuit control unit 109 responsive to the internal clock signal CLK-0. The input circuit control unit 106 latches a signal output from the input circuit control unit 110 responsive to the internal clock signal CLK-180. The OR circuit 107 receives the output signal from the input circuit control unit 109 and an output signal from the input circuit control unit 105. The OR circuit 108 receives the output signal of the input circuit control unit 110 and an output signal of the input circuit control unit 106. The input buffer 111 receives the output signal CLKEN1 of the OR circuit 107 as the input enable signal, and latches an address signal supplied to an input terminal, based on the internal clock signal CLK-0 to output the latched signal as the output A0. The input buffer 112 receives the output signal CLKEN2 of the OR circuit 108 as the input enable signal, and latches the address signal supplied to the input terminal, responsive to the internal clock signal CLK-180, to output the latched signal as the output A180. The output signals A0 and A180 of opposite phases are differentially supplied to the internal circuit not shown.

In this embodiment, which is different from the first embodiment described before, the input circuit control units 109 and 110 are provided, being dedicated to the two-phase internal clock signals CLK-0 and CLK-180, respectively. The input circuit control units 109 and 110 receive the frequency-divided clock signals DIVCLK2 and DIVCLK1 generated by the frequency divider 102, respectively, as the control signals, and can determine to which clock of the two-phase internal clock signals CLK-0 and CLK-180 a command of the chip select signal /CS has been issued.

In the first embodiment described before, as shown in FIG. 4, while the chip select signal /CS is LOW (which is a chip select active state), the input buffers 111 and 112 (for the two-phase internal clock signals CLK-0 and CLK-180, respectively) for an address or the like are (both) activated. In this case, though only one of the input buffers should be primarily activated, both of the input buffers become active. Thus, extra consumption current is generated. Alternatively, an unnecessary signal (that is the signal CLKEN2 though only the signal CLKEN1 should be primarily operated) is also operated, so that the extra consumption current is generated.

On contrast therewith, according to this embodiment, the frequency-divided clock signals DIVCLK2 and DIVCLK1 (having the phases thereof different from each other by 180 degrees and corresponding to the internal clock signals CLK-180 and CLK-0, respectively) from the frequency divider 102 are supplied to the input circuit control units 109 and 110, respectively. Determination as to which clock signal of the internal clock signals CLK-0 and CLK-180, the command of the chip select signal /CS has been issued, thus becomes possible. Then, only a necessary input buffer circuit can be operated by the input enable signal CLKEN1 for the input buffer 111 or the input enable signal CLKEN2 for the input buffer 112. By performing timing adjustment between clock supplied to the input circuit control unit 109 or 110 and the signal DIVCLK1/DIVCLK2 that enables the clock input, latching by the control unit can also be performed perfectly. As a result, the consumption current is reduced.

In each of the embodiments described before, the input buffers for an address or the like are described as the synchronous type input buffers 111 and 112. The present invention, however, is not limited to this configuration. For example, the present invention can be of course applied to a configuration in which the input buffers 111 and 112 for an address or the like are made to be the asynchronous type input buffers and signals output from the asynchronous type input buffers are latched by flip-flop circuits or the like, respectively, as well.

Preferably, the present invention is applied to a clock synchronous semiconductor device including a chip select signal /CS, such as an SDR (Single Date Rate) or a DDR (Double Date Rate). More specifically, preferably, the present invention is applied to a synchronous type semiconductor device which aims at a higher-speed operation and further reduction in power consumption by extending leading and trailing edges of a latch enable signal for a command or an address using a frequency-divided clock in a device capable of a high operation that frequency divides a clock and samples a command or an address.

The above description was given in connection with the embodiments described above. The present invention is not limited to the configurations of the embodiments alone, and of course includes various variations and modifications that could be made by those skilled in the art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A synchronous type semiconductor device comprising:
a clock generation circuit that receives an input clock signal and generate first and second internal clock signals having a predetermined phase difference therebetween;
a first circuit that samples an input chip select signal in synchronization with the input clock signal;
second and third circuits that receive an output signal of said first circuit in common and sample the output signal in synchronization with the first and second internal clock signals, respectively; and
first and second input buffers that receive a result of a logic operation between the output signal of said first circuit and an output signal of said second circuit and a result of a logic operation between the output signal of said first circuit and an output signal of said third circuit as first and second input enable signals, respectively, and sample a common input signal in synchronization with the first and second internal clock signals, respectively, based on enabling instruction by the first and second input enable signals.

2. A synchronous type semiconductor device comprising:
a clock generation circuit that generates first and second internal clock signals having a predetermined phase difference from first and second frequency-divided clock signals having different phases, respectively, the first and second frequency-divided clock signals being obtained by frequency dividing an input clock signal by a frequency divider;
a first circuit that samples an input chip select signal in synchronization with the input clock signal when the second frequency-divided clock signal is active;
a second circuit that samples the input chip select signal in synchronization with the input clock signal when the first frequency-divided clock signal is active;
a third circuit that samples an output signal of said first circuit in synchronization with the first internal clock signal;
a fourth circuit that samples an output signal of said second circuit in synchronization with the second internal clock signal; and
first and second input buffers that receive a result of a logic operation between the output signal of said first circuit and an output signal of said third circuit and a result of a logic operation between the output signal of said second circuit and an output signal of said fourth circuit as first and second input enable signals, respectively, and sample a common input signal in synchronization with the first and second internal clock signals, respectively, based on enabling instructed by the first and second input enable signals.

3. A synchronous type semiconductor device comprising:
a clock generation circuit that receives an input clock signal and generate first and second internal clock signals having a predetermined phase difference therebetween;
a first circuit that samples an input chip select signal in synchronization with the input clock signal;
second and third circuits that receive an output signal of said first circuit in common and sample the output signal in synchronization with the first and second internal clock signals, respectively;
first and second input buffers that receive a result of a logic operation between the output signal of said first circuit and an output signal of said second circuit and a result of a logic operation between the output signal of said first circuit and an output signal of said third circuit as first and second input enable signals, respectively, and sample a common input signal in synchronization with the first and second internal clock signals, respectively, based on enabling instruction by the first and second input enable signals;
a third input buffer that receives a clock signal; and
a fourth input buffer that receives a chip select signal;
wherein said clock generation circuit includes:
a frequency divider that receives a clock signal output from said first input buffer, frequency divides the clock signal, and outputs frequency-divided clock signals; and
a timing adjusting unit that receives the frequency-divided clock signals output from said frequency divider and generates first and second internal clock signals having a predetermined phase difference;
wherein said first circuit includes a first input circuit control unit that receives an output signal of said second input buffer and an output signal of said first input buffer, and samples the output signal of said second input buffer in synchronization with the output signal of said first input buffer;
wherein said second circuit includes a second input circuit control unit that receives an output signal of said first input circuit control unit and the first internal clock signal from said timing adjusting unit, and samples the output signal of said first input circuit control unit in synchronization of the first internal clock signal;

wherein said third circuit includes a third input circuit control unit that receives the output signal of said first input circuit control unit and the second internal clock signal from said timing adjusting unit, and samples the output signal of said first input circuit control unit in synchronization with the second internal clock signal; and wherein said semiconductor device further comprises:
a first logic circuit that receives the output signal of said first input circuit control unit and an output signal of said second input circuit control unit, and outputs a result of a logic operation between the two output signals; and
a second logic circuit that receives the output signal of said first input circuit control unit and an output signal of said third input circuit control unit, and outputs a result of a logic operation between the two output signals.

4. The synchronous type semiconductor device according to claim 3, wherein said first input buffer receives an output signal of said first logic circuit as a first input control signal and latches an address signal supplied to an input terminal in synchronization with the first internal clock signal, when the first input control signal is active; and
said second input buffer receives an output of said second logic circuit as a second input control signal and latches the address signal in synchronization with the second internal clock signal, when the second input control signal is active.

5. The synchronous type semiconductor device according to claim 3, wherein said first input circuit control unit includes a latch circuit that latches the output signal of said second input buffer based on the output signal of said first input buffer;
said second input circuit control unit includes a latch circuit that latches the output signal of said first input circuit control unit based on the first internal clock signal; and
said third input circuit control unit includes a latch circuit that latches the output signal of said first input circuit control unit based on the second internal clock signal.

6. The synchronous type semiconductor device according to claim 3, wherein each of said first and second logic circuits comprises an OR circuit.

7. A synchronous type semiconductor device comprising:
a first input buffer that receives a clock signal;
a frequency divider that receives a clock signal output from said first input buffer, frequency divides the clock signal, and outputs first and second frequency-divided clock signals having phases thereof being different to each other;
a timing adjusting unit that receives the first and second frequency-divided clock signals from said frequency divider and generates first and second internal clock signals having a predetermined phase difference therebetween in association with the first and second frequency-divided clock signals, respectively;
a second input buffer that receives a chip select signal;
a first input circuit control unit that receives an output signal of said second input buffer and the output signal of said first input buffer, receives the second frequency-divided clock signal as an input control signal, and samples the output signal of said second input buffer in synchronization with the output signal of said first input buffer when the second frequency-divided clock signal is active;

a second input circuit control unit that receives the output signal of said second input buffer and the output signal of said first input buffer, receives the first frequency-divided clock signal as an input control signal, and samples the output signal of said second buffer in synchronization with the output signal of said first input buffer when the first frequency-divided clock signal is active;
a third input circuit control unit that receives an output signal of said first input circuit control unit and the first internal clock signal from said timing adjusting unit, and samples the output signal of said first input circuit control unit in synchronization with the first internal clock signal;
a fourth input circuit control unit that receives an output signal of said second input circuit control unit and the second internal clock signal from said timing adjusting unit, and samples the output signal of said second input circuit control unit in synchronization with the second internal clock signal;
a first logic circuit that receives the output signal of said first input circuit control unit and an output signal of said third input circuit control unit, and outputs a result of a logic operation between the two output signals; and
a second logic circuit that receives the output signal of said second input circuit control unit and an output signal of said fourth input circuit control unit, and outputs a result of a logic operation between the two output signals.

8. The synchronous type semiconductor device according to claim 7, comprising:
a third input buffer that receives an output signal of said first logic circuit as a first input control signal and latches an address signal supplied to an input terminal in synchronization with the first internal clock signal, when the first input control signal is active; and
a fourth input buffer that receives an output of said second logic circuit as a second input control signal and latches the address signal in synchronization with the second internal clock signal, when the second input control signal is active.

9. The synchronous type semiconductor device according to claim 7, wherein: said first input circuit control unit includes a latch circuit that latches the output signal of said second input buffer based on the output signal of said first input buffer when the second frequency-divided clock signal is active; and
said second input circuit control unit includes a latch circuit that latches the output signal of said second input buffer based on the output signal of said first input buffer when the first frequency-divided clock signal is active.

10. The synchronous type semiconductor device according to claim 7, wherein said third input circuit control unit includes a latch circuit that latches the output signal of said first input circuit control unit based on the first internal clock signal; and
said fourth input circuit control unit includes a latch circuit that latches the output signal of said second input circuit control unit based on the second internal clock signal.

11. The synchronous type semiconductor device according to claim 7, wherein each of said first and second logic circuits comprises an OR circuit.

* * * * *